US010021213B2

(12) United States Patent
Dayan et al.

(10) Patent No.: US 10,021,213 B2
(45) Date of Patent: Jul. 10, 2018

(54) SYSTEMS AND METHODS FOR ADAPTIVE CLONING OF MOBILE DEVICES

(71) Applicant: Google Inc., Mountain View, CA (US)

(72) Inventors: Tal Dayan, Los Gatos, CA (US); Marcelo Alcantara, Sunnyvale, CA (US); Maya Ben Ari, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 354 days.

(21) Appl. No.: 14/616,876

(22) Filed: Feb. 9, 2015

(65) Prior Publication Data
US 2016/0234340 A1 Aug. 11, 2016

(51) Int. Cl.
| G06F 15/16 | (2006.01) |
| H04L 29/08 | (2006.01) |
| G06F 8/61 | (2018.01) |
| G06F 9/445 | (2018.01) |

(52) U.S. Cl.
CPC ............ *H04L 67/34* (2013.01); *G06F 8/63* (2013.01); *G06F 9/44505* (2013.01); *H04L 67/06* (2013.01); *H04L 67/1095* (2013.01); *H04L 67/36* (2013.01)

(58) Field of Classification Search
CPC ..... H04L 67/34; H04L 67/1095; H04L 67/06; H04L 67/36; G06F 9/44505; G06F 8/63
See application file for complete search history.

(56) References Cited

U.S. PATENT DOCUMENTS

| 7,913,296 B2 * | 3/2011 | Shigeeda | ............ | H04L 63/0807 |
| | | | | 726/5 |
| 2003/0055735 A1 * | 3/2003 | Cameron | ............... | G06Q 20/04 |
| | | | | 705/27.1 |
| 2004/0098419 A1 | 5/2004 | Bantz et al. | | |
| 2009/0098856 A1 * | 4/2009 | Hsu | ......................... | H04M 1/66 |
| | | | | 455/410 |

(Continued)

OTHER PUBLICATIONS

PCT/US2016/015915 International Search Report and Written Opinion dated Apr. 14, 2016.

(Continued)

*Primary Examiner* — Michael A Keller
(74) *Attorney, Agent, or Firm* — Colby Nipper

(57) ABSTRACT

Certain implementations of the disclosed technology may include systems, methods, and apparatus for adaptive cloning of mobile computing devices. According to an example implementation, a method is provided that includes receiving an indication of source device content associated with a source computing device; receiving an indication of target device information associated with a destination computing device; determining that the source device content is outdated or incompatible with the target device; identifying available alternative content for replacing the source device content; responsive to the identifying available alternative content, outputting, for display, an indication of the available alternative content; receiving an indication of a selection to utilize the available alternative content; and responsive to receiving the indication of the selection, initiating a transmission of the available alternative content to the destination computing device.

23 Claims, 4 Drawing Sheets

(56) References Cited

U.S. PATENT DOCUMENTS

| | | | | |
|---|---|---|---|---|
| 2010/0088401 A1* | 4/2010 | DeGraeve | ............ | H04L 63/0407 709/223 |
| 2010/0287194 A1* | 11/2010 | Watanabe | ............... | G06Q 10/08 707/769 |
| 2010/0332398 A1* | 12/2010 | Aage | ........................ | G06F 21/42 705/64 |
| 2011/0055586 A1* | 3/2011 | Lupton | .................... | G06F 21/31 713/184 |
| 2012/0117558 A1* | 5/2012 | Futty | ................... | G06F 9/44505 717/176 |
| 2012/0323717 A1* | 12/2012 | Kirsch | ............... | G06Q 20/0855 705/26.1 |
| 2013/0198021 A1* | 8/2013 | Gandhi | ................... | G06Q 30/06 705/26.1 |
| 2014/0089671 A1* | 3/2014 | Logue | ................. | H04L 63/0884 713/182 |
| 2014/0123161 A1* | 5/2014 | van Coppenolle | . | H04L 65/4076 725/8 |
| 2014/0156784 A1* | 6/2014 | Buck | ................... | H04L 67/1095 709/217 |
| 2014/0242949 A1* | 8/2014 | Burch | ................... | H04W 12/06 455/411 |
| 2014/0310532 A1* | 10/2014 | Ali | .......................... | G06F 21/81 713/189 |
| 2014/0373117 A1* | 12/2014 | Le Saint | ................. | G06F 21/33 726/6 |
| 2015/0121493 A1* | 4/2015 | Chen | ....................... | G06F 21/36 726/6 |
| 2015/0147065 A1* | 5/2015 | Civelli | .................... | G08C 23/04 398/107 |
| 2016/0248782 A1* | 8/2016 | Troesch | ............. | G07C 9/00007 |
| 2016/0337857 A1* | 11/2016 | Carron | ................ | H04L 63/0428 |
| 2017/0034080 A1* | 2/2017 | Tao | ...................... | H04L 12/6418 |
| 2017/0206373 A1* | 7/2017 | Ali | ......................... | G06F 21/6218 |
| 2017/0244695 A1* | 8/2017 | Lund | .................. | H04L 63/0815 |
| 2018/0013782 A1* | 1/2018 | Choyi | ................. | H04L 63/1433 |

OTHER PUBLICATIONS

"Written Opinion", PCT Application No. PCT/US2016/015915, dated Aug. 15, 2017, 6 pages.

* cited by examiner

SYSTEMS AND METHODS FOR ADAPTIVE CLONING OF MOBILE DEVICES

BACKGROUND

When a user purchases a new mobile computing device to replace a functioning, but older device, the user typically prefers to "clone" the application and configuration content from the old to the new device. However, there are many challenges that arise in the cloning or migrating process. For example, incompatibilities in software, hardware, security constraints, licenses, etc. between the new and old device can make the process of migration very difficult and time consuming. In certain cases, attempts at a brute-force approach of copying everything from the old to new device can leave the new device partially or wholly non-functional.

In a typical setup of a new device, a user may configure Internet connectivity, add user accounts, establish backup capability, add applications, personalize the device, etc. While "setup wizards" may have reduced some of the complexity of performing these tasks, there is still a need for techniques to allow for device cloning to reduce the complexity and duration of the configuration/migration tasks while allowing for remote storage and re-use of the device's configuration.

SUMMARY

Some or all of the above needs may be addressed by certain implementations of the disclosed technology. Certain implementations may include systems and methods for adaptively cloning or migrating content from one computing device to another.

A computer-implemented method is provided in accordance with an example implementation of the disclosed technology. The method can include receiving an indication of source device content associated with a source computing device and receiving an indication of target device information associated with a destination computing device. The method includes determining, based on the indication of the source device content and the indication of the target device information, that the source device content is outdated or incompatible with the target device. The method further includes identifying, based on the determining, available alternative content for replacing the source device content. Responsive to the identifying the available alternative content, the method includes outputting, for display, an indication of the available alternative content. The method also includes receiving an indication of a selection to utilize the available alternative content, and responsive to receiving the indication of the selection, initiating a transmission of the available alternative content to the destination computing device.

According to another example implementation, a system is provided. The system includes a computer configured to: receive an indication of source device content associated with a source computing device; receive an indication of target device information associated with a destination computing device; determine, based on the indication of the source device content and the indication of the target device information, that the source device content is outdated or incompatible with the target device; identify, based on the determining, available alternative content for replacing the source device content; output, for display, an indication of the available alternative content; receive an indication of a selection or confirmation to utilize the available alternative content; and initiate a transmission of the available alternative content to the destination computing device.

According to an example implementation of the disclosed technology, a computer-readable medium is provided. The computer-readable medium may be encoded with a computer program with computer-executable instructions that when executed by a computer having at least one processor causes the computer to perform, a method comprising: receiving an indication of source device content associated with a source computing device; receiving an indication of target device information associated with a destination computing device. The method includes determining, based on the indication of the source device content and the indication of the target device information, that the source device content is outdated or incompatible with the target device. The method further includes identifying, based on the determining, available alternative content for replacing the source device content. Responsive to the identifying the available alternative content, the method includes outputting, for display, an indication of the available alternative content. The method includes receiving an indication of a selection or confirmation to utilize the available alternative content; and responsive to receiving the indication of the selection or confirmation, initiating a transmission of the available alternative content to the destination computing device.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

The disclosed technology relates to systems and methods for adaptive cloning, provisioning, and/or migration of content to a destination device. Certain example implementations of the disclosed technology may map and/or harmonize the migration of content to conform to a target device by utilizing one or more of a database, provisioning rules, source device information, and/or target device information. For example, certain implementations may perform one or more of the following: determine what information to copy; suggest alternative/newer elements to copy; utilize physical proximity to an old device as a means of security; optimize the new device; purchase licenses for licensed material; copy metadata for later download (MP3s, for example); provide dynamic configuration (automatically, or in response to explicit instructions); and/or provide eager vs. deferred loading depending on network connectivity.

The term "content" as used herein, may refer to one or more of applications, images, videos, music, files, account credentials, security credentials, metadata, hyperlinks, settings, games, status, metadata, license, current state, history, etc. Some implementations of the disclosed technology will be described more fully hereinafter with reference to the accompanying drawings. This disclosed technology may, however, be embodied in many different forms and should not be construed as limited to the implementations set forth herein. Henceforth, the general term "provisioning" will be utilized to represent one or more of the processes involved with the adaptive cloning/migration and/or configuration of information from a first computing device to a second computing device.

Figure 1:
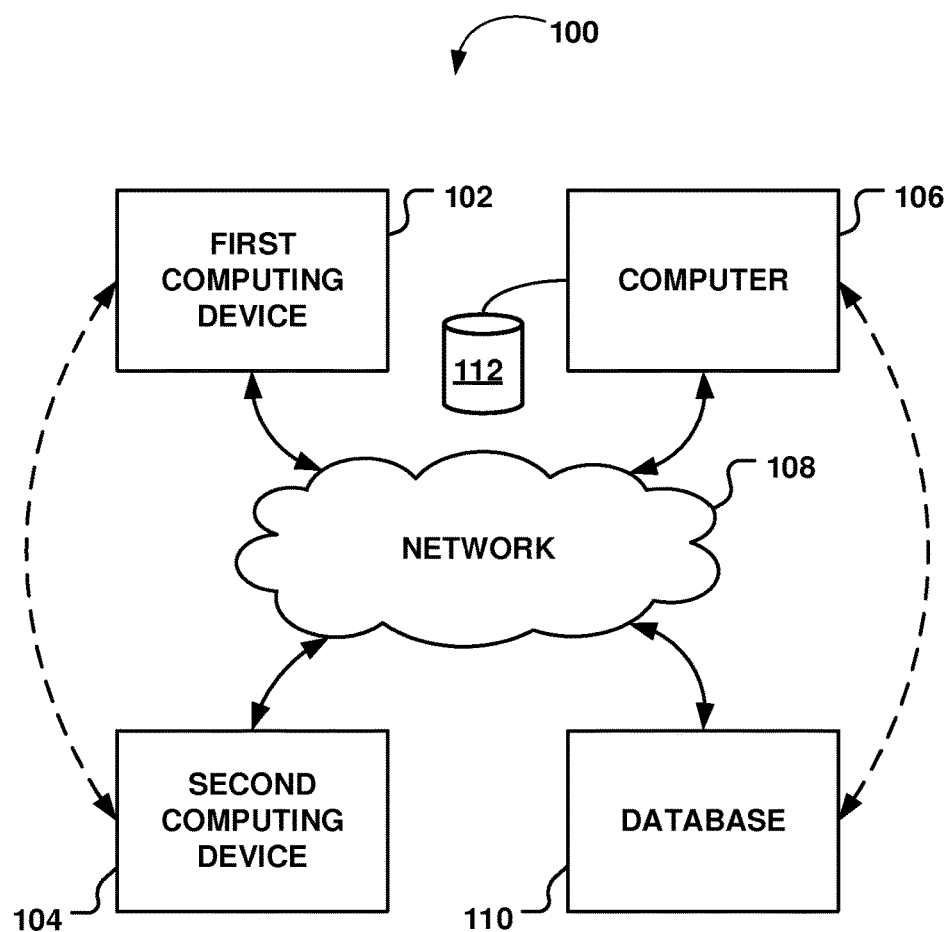
FIG. 1 depicts one embodiment of an adaptive provisioning system 100, in accordance with various aspects set forth herein.

FIG. 1 depicts one embodiment of an adaptive provisioning system 100 in accordance with various aspects set forth herein. In certain example implementations, the system 100 may be configured to connect to and communicate with a first computing device 102 and/or a second computing device 104. In one example implementation, it may not be necessary for the first computing device 102 and the second computing device to be connected simultaneously, particularly if the content from first computing device 102 has been previously saved and stored in a memory associated with system 100. Thus, one example implementation may allow asynchronous communication between the first computing device 102 and the second computing device 104 via additional components such as a computer 106, network 108, database 110, storage 112, etc. In certain example implementations, the database 110 may be accessible to the network 108, for example, to provide certain data and/or rules for the provisioning process. In certain implementations, the computer 106 may store content that is received from the first computing device 102 in a memory 112, and such content may be retrieved for provisioning the second computing device 104.

In accordance with an example implementation of the disclosed technology, the first computing device 102 may be considered as a source device, and the second computing device 104 may be considered as a target or destination device. In certain implementations, the computer 106 (as depicted in FIG. 1) may execute provisioning software on a computer hardware system, for example, to manage content transfer via the various interfaces between the first computing device 102 and the second computing device 104.

According to an example implementation of the disclosed technology, the computer 106 may execute one or more services. Further, the computer 106 may include one more computer programs running to serve requests or provide content to local computer programs executing on the computer 106 or remote computer programs executing on the computing devices 102 104. The computer 106 may be capable of performing functions associated with a database server, a file server, a mail server, a print server, a web server, a gaming server, the like, or any combination thereof, whether in hardware or software.

In one example, the computer 106 may be a web server. In another example, the computer 106 may be a file server. In an example implementation, the computer 106 may be configured to process requests or provide content to computing devices over the network 108. The network 108 may encompass wired or wireless communication networks such as a local-area network (LAN), a wide-area network (WAN), a computer network, a wireless network, a telecommunications network, or any combination thereof. For example, the network 108 may include the Internet, a cellular network and a Wi-Fi network.

In accordance with an example implementation of the disclosed technology, the database 110 may refer to a collection of data and supporting data structures. Further, the database 110 may include a computer. In one example, the database 110 may be a collection of content managed by a computer. In another example, the database 110 may be integrated with the computer 106.

In accordance with an example implementation of the disclosed technology, the first computing device 102 may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or the like. Similarly, the second computing device 104 may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or the like.

In an example implementation, embodiment, the computer 106 may be utilized to determine and provide configuration options for the second computing device 104 based on information associated with the first computing device 102. The configuration options, for example, may include various options associated with a setting, an account, an application, a library, music, a video, the like, or any other configuration content that may be modified by a user of the second computing device 104. In one example, the configuration options may be associated with and include Internet connectivity, Wi-Fi connectivity, Bluetooth connectivity, a user account, a backup configuration, payment information, device personalization such as a wallpaper, ringtone, font size or the like, and applications. In addition, the configuration options may allow for selection of one or more versions of these various options. Furthermore, the configuration options may be provided or presented to include various input elements such as a text field, a checkbox, a password, a radio button, a submit button, the like, or any combination thereof.

In an example implementation, the first computing device 102 may output certain content for configuring the second computing device 104. In certain example implementations, the computer 106 may control all or part of the provisioning from the first computing device 102 to the second computing device 104. For example, the first computing device 102 may output the configuration options for the second computing device 104 to the computer 106 via a web page hosted by the computer 106. In another example implementation, the provisioning process may utilize an application executing on the second computing device 106 that is in communication with the computer 108. In one example implementation, the configuration content for the second computing device 104 may include a setting, an account, an application, a library, music, a video, metadata, and/or the like, or any other configuration content that may be utilized by the second computing device 104.

In an example implementation, the computer 106 may output to the first computing device 102 (for example, via the network 108) a request for a first security identifier for the second computing device 104. In response, the first computing device 102 may output to the computer 106 the first security identifier. In accordance with certain implementation, the first security identifier may a personal identification number (PIN), a gesture, a pattern, an image, the like, or an identifier that is capable of securely unlocking the second computing device 104. In one example implementation, and prior to outputting a request to the computer 106 for the configuration content or the first security identifier, the second computing device 104 may establish communication with the computer 106. The second computing device 106 may output, for display, a request for network connectivity information. In response to the request for network connectively information, the second computing device 104 may receive the network connectivity information. Once the communication with the computer 106 is established, the second computing device 104 may send a request to the computer 106 for the configuration content, the first security identifier, or both. In response, the computer 106 may send the configuration content, the first security identifier, or both to the second computing device 104. In one example implementation, once the configuration content is received, the second computing device 104 may use the configuration content to configure itself. Further, once the first security identifier is received, the second computing device 104 may output, for display, a request to provide a second security identifier. After determining that the second security identifier is the same as the first security identifier, the second computing device 104 may be ready for use.

In another example implementation, the computer 106 may access a database 110 to obtain identification and/or provisioning content for the second computing device 104. In one example implementation, the identification content may include information unique to a particular computing device. Further, the identification content may be used to identify and authenticate the computing device on a network. In one example, the identification content may be the same as or similar to the content contained in a subscriber identification module (SIM). In response to a request for the identification content of the second computing device 104, the computer 106 may output to the second computing device 104 the identification content of the second computing device 104.

In another example embodiment, the computer 106 may generate and output a first security identifier for the second computing device 104 to the first computing device 102. In one example, the computer 106 may output the first security identifier to the first computing device 102 via a web page hosted by the computer 106, an e-mail sent from the computer 106 to the first computing device 102, an application executing on the second computing device 104 that is in communication with the computer 106, or the like.

In another example implementation, once the communication with the computer 106 is established, the second computing device 104 may send a request to the computer 106 for the configuration content. Further, the second computing device 104 may provide to the computer 106 a second security identifier. In response to the request, the computer 106 may determine that the first security identifier is the same as the second security identifier. Further, in response to determining that the first security identifier is the same as the second security identifier, the computer 106 may send the configuration content to the second computing device 104. Once the configuration content is received, the second computing device 104 may use the configuration content to, at least partially, configure itself.

Figure 2:
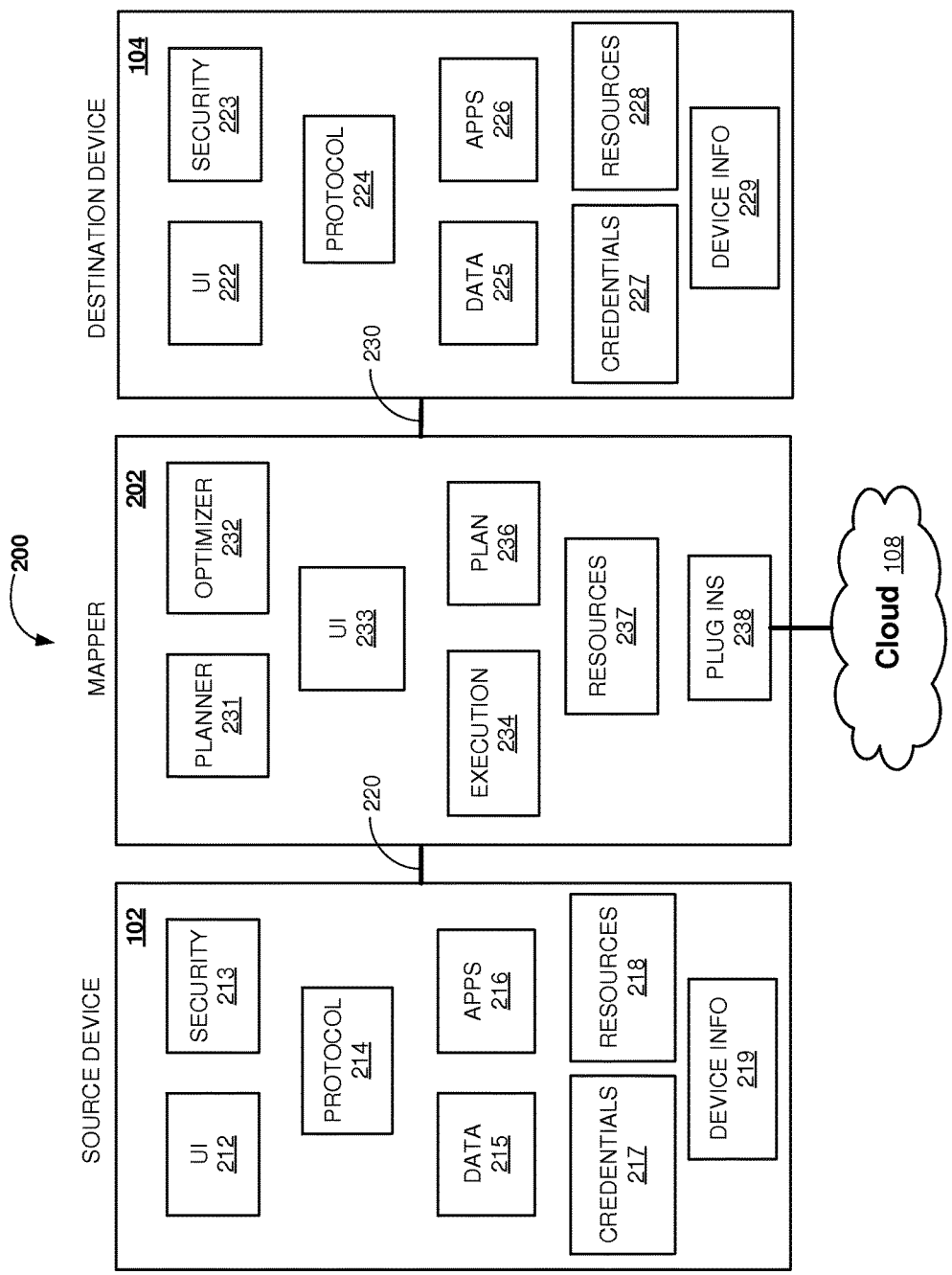
FIG. 2 is an illustrative block diagram of another adaptive provisioning system 200, according to an example implementation of the disclosed technology.

FIG. 2 is a block diagram of another adaptive provisioning system 200, which may be embodied and/or include similarities to the adaptive provisioning system 100 as described above with respect to FIG. 1. Certain implementations of the adaptive provisioning system 200, as shown in FIG. 2, may include a cloning mapper 204 for facilitating communication among the first computing device 102 (also interchangeably denoted herein as the "source device") and the second computing device 104 (also denoted interchangeably herein as the "destination device" or "target device"). In accordance with an example implementation of the disclosed technology, the cloning mapper 204 may facilitate provisioning content from the source device 102 to the destination device 104. In certain example implementations, the state of the source device 102 may be determined by its content, which can include data 215, (for example, images, music, game states, etc), installed apps 216, security credentials 217 (for accounts it can access), resources 218 (e.g. a library of wall papers, backgrounds, ringtones, etc.,) and so on. The above-mentioned list of types, categories and/or classifications of content available for provisioning should not be considered as an exhaustive list, as the details can change from device to device. In accordance with certain example implementations, one or more of block, modules, and/or information from the source device 102 (for example, the data 215, installed apps 216, security credentials 217, and/or resources 218) may be utilized for provisioning one or more of the corresponding elements of the destination device 104 (for example, the data 225, apps 226, credentials 227, and/or resources 288).

In accordance with an example implementation, the device information 219 229 may include data about the source device 102 and/or the target device 104, such as memory size, make and model, supported capabilities, etc. In certain example implementations, the security modules 213 223 may be utilized to protect against unauthorized access (e.g. an attempt to clone the device by unauthorized user), as previously discussed. In certain example implementations, the user interface (UI) 212 222 may provide interaction with the user, for example to communicate provisioning options and/or to receive confirmations.

In accordance with an example implementation, the protocol modules 214 224 may be utilized for interfacing with the cloning mapper 202, for example, to support functionality such as remote API, access to local resources, and so on. In certain example implementations, the protocol modules 214 224 may use one or more communication channels 220 230 such as wired or wireless connections, cloud storage or store and forward system, and so on. In certain example implementations, the supported functionality of the destination device 104 may be similar to that of the source device 102. In certain example implementations, the cloning mapper 202 may interact with the source device 102 and/or the destination device(s) 104 via respective communication channels 220 230 such as via the network 108 (or cloud) as discussed above with reference to FIG. 1.

The various modules and functions associated with the mapper 202 will now be discussed in detail with continued reference to FIG. 2. According to an example implementation of the disclosed technology, the planner 231 may be utilized to query the metadata of the source device 102 and/or the destination device 104. In certain example implementations, the planner 231 may analyze the content/capabilities of the source device 102 and destination device 104 and prepare execution of the provisioning process. For example, the planner 231 may decide what to copy as is, what not to copy, and what to replace with alternative content.

In one example implementation, the planner 231 may be utilized to generate queries for presentation via the one or more user interfaces 212 224 223, for example, to provide the user with configuration options. For example, the planner 231 may determine that certain content utilized by the source device 102 is not available, compatible, and/or licensed to be used on the destination device 104. Responsive to determining, the planner 231 may generate one or more queries for presentation to the user for her selection. As an example, (and not intended as a limitation) certain queries may be generated, as needed, for presentation to the user, such as:

Which of the two replacement wallpapers you would like to use on the new device?

The XYZ game is on your old device but it requires a license for each device. Would you like to pay $0.99 now to buy the license for the XYZ game for your second device?

An ABC music file and license has been detected on your old device, but it is not licensed for your new device. Would you like the ABC music license transferred to your new device?

Only 3 of your 5 games will fit on the new device, which ones do you want to keep?

Your new device needs security credentials for logging into your Social Networking site. Do you want to add the credentials now and login so we can configure your new device for seamless access to the Social Networking site?

The 123 application on your old device is outdated and a new version is available. Do you want to install the newer version of this application on your new device?

The list above is not exhaustive but it is intended to provide various examples of the types of queries that may be generated by the mapper 202 and associated modules during the provisioning process, for example, to handle incompatibilities, alternatives, licensing issues, etc.

In certain example implementations, the planner 231 may utilize an optimizer 232 function, for example, to provide certain planning, queries, etc., in case of incompatibilities, exceptions, or other provisioning issues that may require additional analysis. In certain example implementations, the results generated by the planner 231 and/or the optimizer 232 may be distilled to a plan 236 that may be implemented by the execution module 234 for the actual provisioning of information from the source device 102 to the destination device 104.

In accordance with an example implementation of the disclosed technology, and with continued reference to FIG. 2, certain resources 237 (for example, images, music clips and other content) may be available for the mapper 202 to offer as replacements or alternatives when incompatibilities or other provisioning issues are detected. In certain example implementations, the mapper 202 may utilize content-specific plug-ins 238 for decisions about file transfers. In certain example implementations, a plug-in 238 may be utilized by the mapper 202 to provide alternative replacement applications, music files, etc. For example, a plug-in 238 may inform the planner 231 that there is no need to copy certain cached music files from the source device 102 to the destination device 104 because such files are already stored in the cloud, associated with the user account, and can be restored to the destination device 104.

In certain example implementations, the planner 231 may use the UI 233 to interact with the user, for example to enter credentials or to choose between alternative mapping decisions. In certain example implementations, once the plan 236 is completed, the execution module 234 may be utilized to execute the plan while showing the user progress information. However, in most cases user intervention is not necessary because the decisions were already made in the planning stage.

In accordance with certain example implementations, the various functionalities of the mapper 202 can be implemented on the source device 102. In another example implementation, the functionalities of the mapper 202 can be implemented on the destination device 102. Yet in other example implementations, the functionalities of the mapper 202 can be implemented via the network 108, or any mix of the above.

In certain example implementations, the source device 102 can be an actual computing device, such as a smart phone. In another example implementation, the source device 102 may be embodied as a backup set of content (for example, from a source device), which may be helpful for cloning a lost device without requiring access to the lost device. In accordance with an example implementation of the disclosed technology, mixed cloning may be utilized, for example, to provision or clone a destination device 104 with content from more than one source device 102.

Certain example implementations may include transfer cloning, in which a user may indicate that the source device 102 is no longer needed. In one example implementation, the provisioning process may transfer and/or remove security credentials and/or other data from the source device 102.

Various implementations of the communication systems and methods herein may be embodied in non-transitory computer readable media for execution by a processor. An example implementation may be used in an application of a mobile computing device, such as a smartphone or tablet, but other computing devices may also be used, such as portable computers, tablet PCs, Internet tablets, PDAs, ultra mobile PCs (UMPCs), etc.

Figure 3:
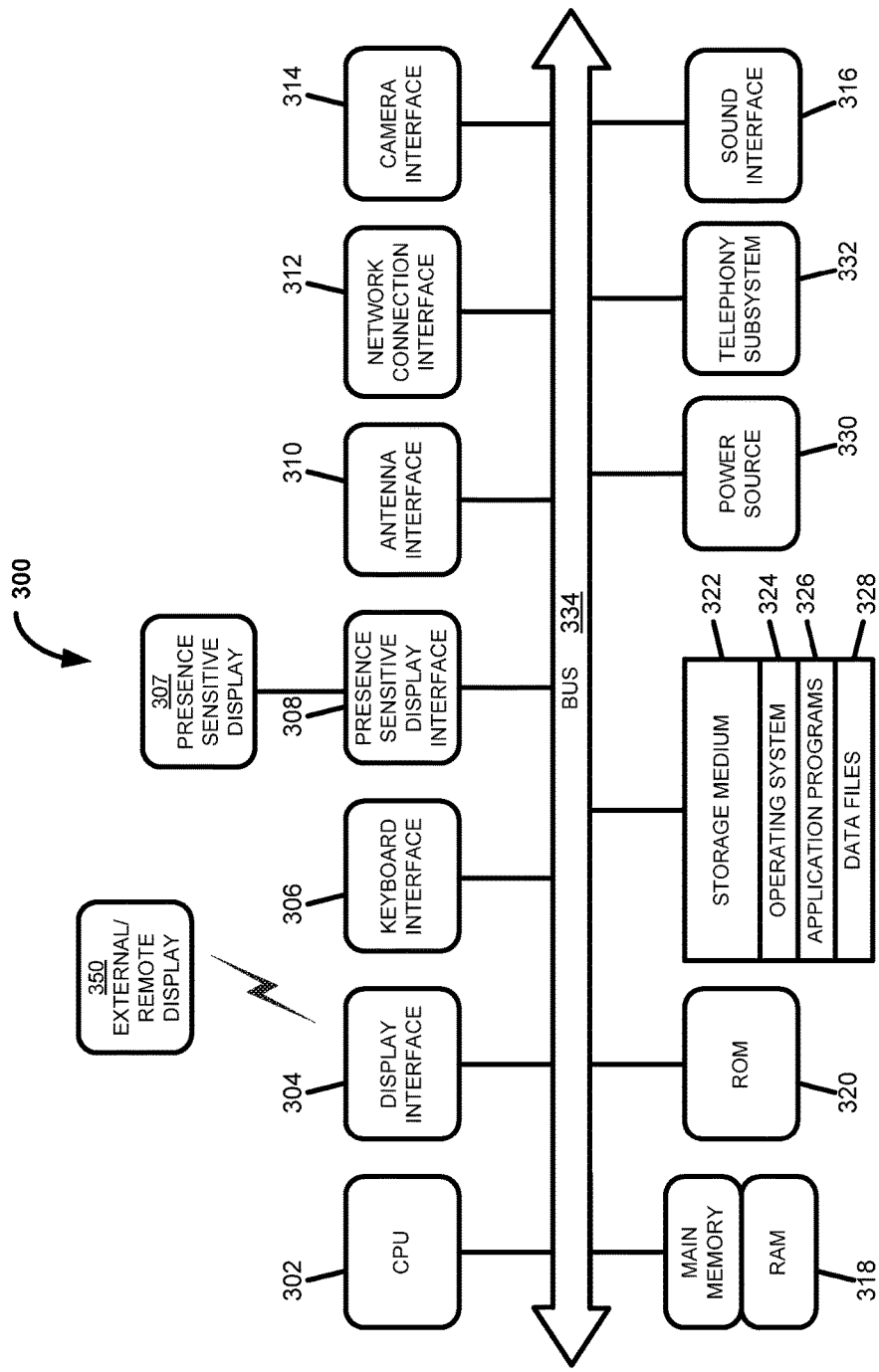
FIG. 3 is a block diagram of an illustrative computing system 300 according to an example implementation of the disclosed technology.

FIG. 3 depicts a block diagram of an illustrative computing device 300 according to an example implementation. Certain aspects of FIG. 3 may be embodied in a mobile computing device (for example, the computing device 102 as shown in FIGS. 1 and 2). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer, for example. In this example implementation, the computing device may output content to its local display and/or speaker(s) and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and content files 328 are stored. According to an example implementation, the computing device 300 includes a power source 330 that provides an appropriate alternating current (AC) or direct current (DC) to power components. According to an example implementation, the computing device 300 includes and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3).

In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

Figure 4:
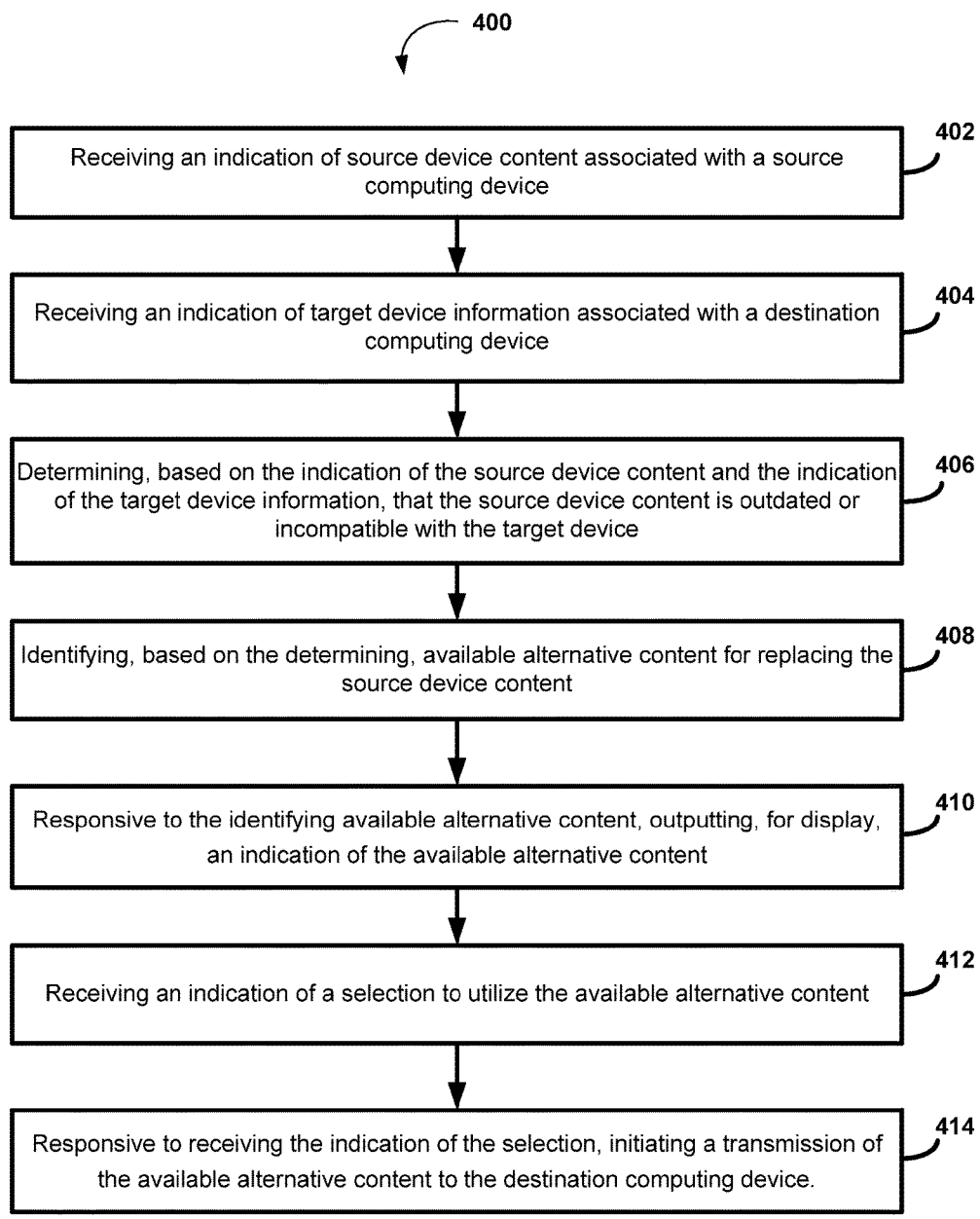
FIG. 4 is a flow diagram of a method 400 according to an example implementation of the disclosed technology.

An example method 400 will now be described with reference to the flowchart of FIG. 4. The method 400 starts in block 402, and according to an example implementation, includes receiving an indication of source device content associated with a source computing device. In block 404, the method 400 includes receiving an indication of target device information associated with a destination computing device. In block 406, the method 400 includes determining, based on the indication of the source device content and the indication of the target device information, that the source device content is outdated or incompatible with the target device. In block 408, the method includes identifying, based on the determining, available alternative content for replacing the source device content. In block 410, the method 400 includes, responsive to the identifying available alternative content, outputting, for display, an indication of the available alternative content. In block 412, the method 400 includes receiving an indication of a selection to utilize the available alternative content. In block 414, the method 400 includes, responsive to receiving the indication of the selection, initiating a transmission of the available alternative content to the destination computing device.

In certain example implementations, the alternative content can include an updated version of the source device content. In an example implementation, the updated version of the source device content is compatible with the destination computing device.

Certain example implementations of the disclosed technology may include determining that alternative content is available. For example, this may be based upon a determination that the source device content is not compatible with the destination computing device. In certain example implementations, the alternative content can include replacement content for the source device content, where the alternative content is compatible with the destination computing device.

In certain example implementations, the availability and/or unavailability of alternative content may be used to control whether or not an indication is output for display signifying the availability of alternative data.

In accordance with an example implementation of the disclosed technology, the source device content and/or the alternative content can include one or more of applications, images, videos, music, files, account credentials, security credentials, metadata, hyperlinks, settings, games, status, metadata, license, current state, history etc.

In an example implementation, the target device information can include one or more of history, memory size, make, model, and supported capabilities.

In an example implementation, receipt of the indication from the source device and/or the transfer of the content to the second device may be done via asynchronous communication. For example, in one example implementation, it is not necessary for the source device to be connected to the system at the same time that the destination device is connected to the system. In one example implementation, content from the source device may copied to the system (and/or mapper 202) before being copied to the destination device.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for remote device configuration. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, systems, or articles of manufacture described herein are in conjunction with remote device configuration, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

We claim:

1. A computer-implemented method, comprising:
   receiving an indication of first device content associated with a first computing device;
   receiving an indication of second device information associated with the second computing device;
   determining, based on the indication of the first device content and the indication of the second device information, that the first device content is outdated or that the first device content is unavailable to, or incompatible with, the second computing device;
   identifying, based on the determining, available alternative content for replacing the first device content that is outdated, unavailable, or incompatible;
   responsive to the identifying available alternative content, outputting, for display, an indication of the available alternative content;
   receiving a selection to utilize the available alternative content;
   responsive to receiving the selection, initiating a transmission of the available alternative content to the second computing device; and
   following the transmission of the available alternative content to the second computing device, removing the first device content from the first computing device.

2. The method of claim 1, wherein the available alternative content comprises an updated version of the first device content that is compatible with the second computing device.

3. The method of claim 1, wherein the identifying available alternative content comprises determining that the first device content is not compatible with the second computing device, and wherein the available alternative content comprises replacement content for the first device content.

4. The method of claim 1, wherein the first device content comprises one or more of applications, images, videos, music, files, account credentials, security credentials, metadata, hyperlinks, settings, games, status, metadata, license, current state, or history.

5. The method of claim 1, wherein the second device information comprises one or more of memory size, make, model, history, or supported capabilities.

6. The method of claim 1, wherein initiating a transmission of the available alternative content to the second computing device comprises asynchronous communication.

7. The method of claim 1, wherein the first device content from the first computing device is copied to an external memory before being transferred to the second computing device.

8. A system, comprising:
   a computer configured to:
   receive an indication of first device content associated with a first computing device;
   receive an indication of second device information associated with a second computing device;
   determine, based on the indication of the first device content and the indication of the second device information, that the first device content is outdated or that the first device content is unavailable to, or incompatible with, the second computing device;
   identify, based on the determining, available alternative content for replacing the first device content that is outdated, unavailable, or incompatible;
   output, for display, an indication of the available alternative content and a query, the query comprising one or more selectable options for utilizing the available alternative content;
   receive, from among the one or more selectable options, a selection to utilize the available alternative content;
   initiate a transmission of the available alternative content to the second computing device; and
   following the transmission of the available alternative content to the second computing device, removing the first device content from the first computing device.

9. The system of claim 8, wherein the available alternative content comprises an updated version of the first device content that is compatible with the second computing device.

10. The system of claim 8, wherein the available alternative content comprises replacement content that is compatible with the second computing device.

11. The system of claim 8, wherein the first device content comprises one or more of applications, images, videos, music, files, account credentials, security credentials, metadata, hyperlinks, settings, games, status, metadata, license, current state, or history.

12. The system of claim 8, wherein the second device information comprises one or more of history, memory size, make, model, or supported capabilities.

13. The system of claim 8, wherein the first device content from the first computing device is copied to an external memory before being transferred to the second computing device.

14. The system of claim 8, wherein the selectable options include:
choosing between multiple versions of the available alternative content;
choosing a subset of the available alternative content, the subset having a file size based on memory limitations of the second computing device;
entering security credentials prior to initiating the transmission;
purchasing a license for the available alternative content;
transferring a license for the available alternative content; or
installing a different version of the available alternative content.

15. The system of claim 8, wherein the computer further comprises a planner and wherein the planner is configured to:
determine, by querying metadata of the first computing device or the second computing device, whether the first device content is available, compatible, or may be licensed to be used on the second computing device; and
generate the query comprising the one or more selectable options for utilizing the available alternative content.

16. A non-transitory computer-readable medium encoded with a computer program, the computer program comprising computer-executable instructions that when executed by a computer having at least one processor causes the computer to perform, a method comprising:
receiving an indication of first source device content associated with a first source computing device;
receiving a second indication of second source device content associated with a second source computing device;
receiving an indication of target device information associated with a target computing device;
determining, based on the indication of the first source device content, the second indication of the second source device content, and the indication of the target device information, that the first source device content or the second source device content is outdated or that the first source device content or the second source device content is unavailable to, or incompatible with, the target computing device;
identifying, based on the determining, available alternative content for replacing the first source device content or the second source device content that is outdated, unavailable, or incompatible;
responsive to the identifying available alternative content, outputting, for display, an indication of the available alternative content, the indication comprising one or more selectable options for utilizing the available alternative content on the target device;
receiving, for the selectable options, a selection to utilize the available alternative content according to the one or more selected options;
responsive to receiving the indication of the selection, initiating a transmission of the available alternative content to the target computing device; and
following the transmission of the available alternative content to the target computing device, removing the first source device content from the first source computing device.

17. The non-transitory computer-readable medium of claim 16, wherein the available alternative content comprises an updated version of the first source device content or the second source device content that is compatible with the target computing device.

18. The non-transitory computer-readable medium of claim 16, wherein the identifying available alternative content comprises determining that the first source device content or the second source device content is not compatible with the target computing device, and wherein the alternative content comprises replacement content for the first source device content or the second source device content that is compatible with the target computing device.

19. The non-transitory computer-readable medium of claim 16, wherein the first source device content or the second source device content comprises one or more of applications, images, videos, music, files, account credentials, security credentials, metadata, hyperlinks, settings, games, status, metadata, license, current state, or history.

20. The non-transitory computer-readable medium of claim 16, wherein the target device information comprises one or more of history, memory size, make, model, or supported capabilities.

21. The non-transitory computer-readable medium of claim 16, wherein initiating a transmission of the available alternative content to the target computing device comprises asynchronous communication.

22. The non-transitory computer-readable medium of claim 16, wherein the selectable options include:
choosing between multiple versions of the available alternative content;
choosing a subset of the available alternative content, the subset having a file size based on memory limitations of the target computing device;
entering security credentials prior to initiating the transmission;
purchasing a license for the available alternative content;
transferring a license for the available alternative content; or
installing a different version of the available alternative content.

23. The non-transitory computer-readable medium of claim 16 wherein the instructions further comprise:
following the transmission of the available alternative content to the target computing device, removing the first source device content from the first source computing device or removing the second source device content from the second source computing device.

* * * * *